(12) United States Patent
Horishita

(10) Patent No.: US 10,009,496 B2
(45) Date of Patent: Jun. 26, 2018

(54) INFORMATION PROCESSING APPARATUS AND METHOD FOR CONTROLLING THE SAME

(71) Applicant: CANON KABUSHIKI KAISHA, Tokyo (JP)

(72) Inventor: Yusuke Horishita, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 15/069,729

(22) Filed: Mar. 14, 2016

(65) Prior Publication Data

US 2016/0277618 A1    Sep. 22, 2016

(30) Foreign Application Priority Data

Mar. 18, 2015 (JP) ................................ 2015-054678

(51) Int. Cl.
*H04N 1/00* (2006.01)
*G06K 9/00* (2006.01)

(52) U.S. Cl.
CPC ..... *H04N 1/00891* (2013.01); *H04N 1/00251* (2013.01); *H04N 1/00854* (2013.01); *G06K 9/00221* (2013.01)

(58) Field of Classification Search
CPC ........ G06F 21/00; G06F 21/608; G06F 21/81; H04N 1/0222; H04N 1/00299; H04N 1/32713; H04N 1/32767; H04N 1/00323; H04N 1/00336; H04N 1/00891; H04N 1/00896; H04N 1/00904; Y02B 60/1289

USPC ........ 358/1.11–1.18; 382/118; 713/300, 320, 713/323, 324, 330, 186; 726/2, 26, 27, 726/28, 30
See application file for complete search history.

(56) References Cited

U.S. PATENT DOCUMENTS

| | | | |
|---|---|---|---|
| 6,934,042 B1 * | 8/2005 | Morita | G06T 1/20 358/1.15 |
| 2002/0025835 A1 * | 2/2002 | Izumi | H04M 1/725 455/557 |
| 2004/0212677 A1 * | 10/2004 | Uebbing | H04N 5/247 348/155 |
| 2009/0148006 A1 * | 6/2009 | Hayasaki | G06K 9/00221 382/118 |

(Continued)

FOREIGN PATENT DOCUMENTS

JP    2014-098894 A    5/2014

*Primary Examiner* — Chad Dickerson
(74) *Attorney, Agent, or Firm* — Canon U.S.A., Inc. IP Division

(57) ABSTRACT

An information processing apparatus includes an image acquisition unit, a first control unit, a second control unit, and a power control unit. The first control unit performs a process for detecting a moving object using image data acquired by the image acquisition unit. The second control unit performs a process for authenticating a user who uses the information processing apparatus using the image data acquired by the image acquisition unit. The power control unit shifts the information processing apparatus to a power saving mode in which electric power is supplied to the first control unit and in which supply of electric power to the second control unit is stopped. In the power saving mode, the power control unit shifts the information processing apparatus to a normal power consumption mode in which electric power is supplied to the second control unit when the first control unit detects a moving object.

16 Claims, 8 Drawing Sheets

(56) References Cited

U.S. PATENT DOCUMENTS

| | | | |
|---|---|---|---|
| 2011/0228075 A1* | 9/2011 | Madden | G03B 15/05 348/81 |
| 2012/0287035 A1* | 11/2012 | Valko | G06F 1/3231 345/156 |
| 2013/0188825 A1* | 7/2013 | Tsou | G06F 3/017 382/103 |
| 2013/0335334 A1* | 12/2013 | Zhu | G06F 3/042 345/173 |
| 2014/0104636 A1* | 4/2014 | Baba | H04N 1/00323 358/1.14 |
| 2014/0118257 A1* | 5/2014 | Baldwin | G06F 3/017 345/158 |
| 2015/0002877 A1* | 1/2015 | Ono | G06K 15/4055 358/1.14 |

\* cited by examiner

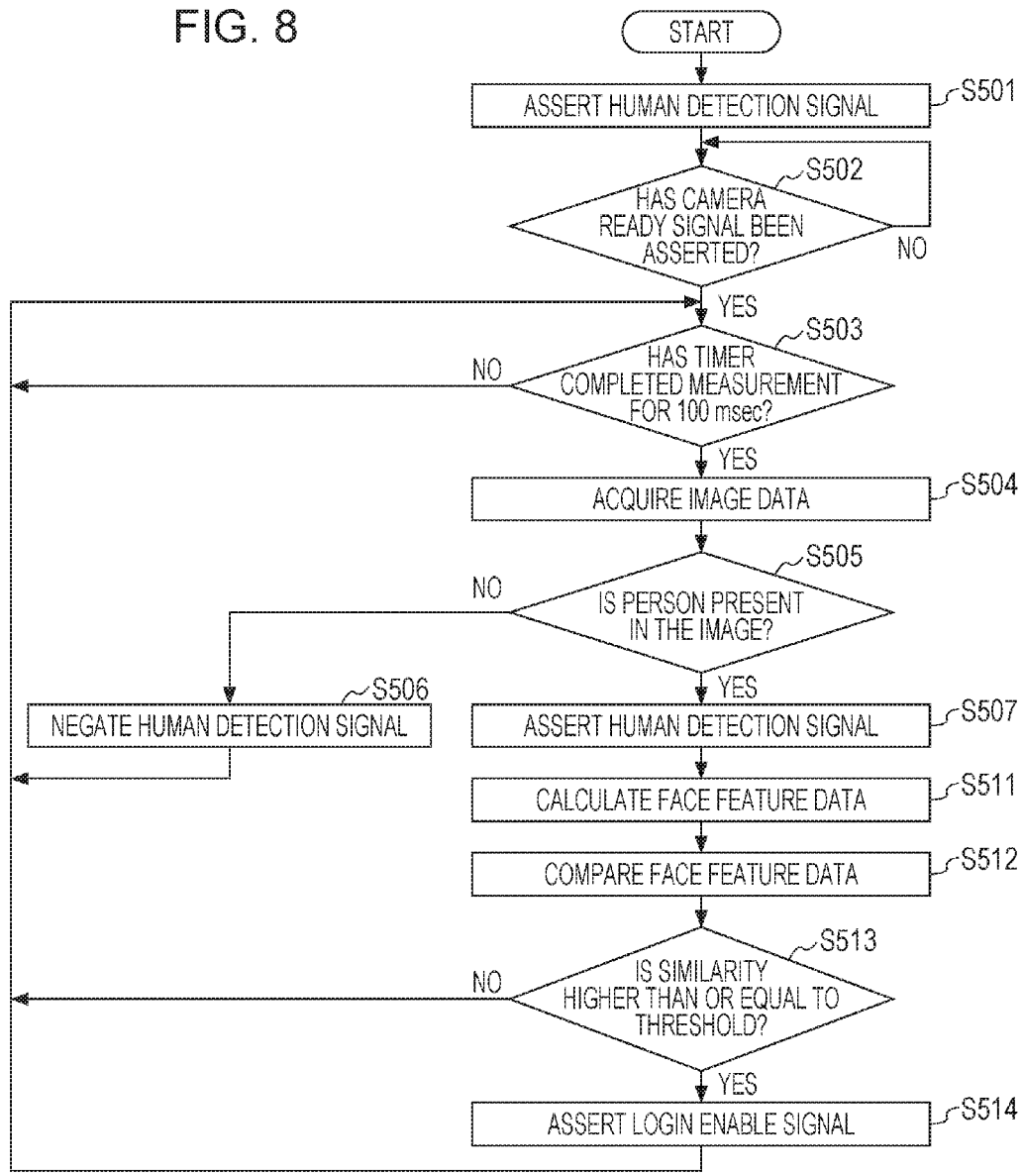

INFORMATION PROCESSING APPARATUS AND METHOD FOR CONTROLLING THE SAME

BACKGROUND OF THE INVENTION

Field of the Invention

The present invention relates to an information processing apparatus and a method for controlling the information processing apparatus.

Description of the Related Art

In recent years, a technique for analyzing image data acquired with a camera to detect the motion of a person and to identify and authenticate an individual from data on the face has been put into practical use.

A technique disclosed in Japanese Patent Laid-Open No. 2014-98894 is a technique for performing power-saving control by activating three sensors: a pyroelectric sensor, a human detection camera, and a face-recognition camera, in stages. First, when the pyroelectric sensor detects a moving object in front of an image forming apparatus, the human detecting camera is supplied with electric power. The human detecting camera determines whether a person present in front on the image forming apparatus is a user who uses the image forming apparatus. When the human detecting camera determines that the person in front of the image forming apparatus is a user who uses the image forming apparatus, the face recognition camera is supplied with electric power. The face recognition camera is used to perform an authentication process based on the acquired data on the face of the user. Thus, the technique disclosed in Japanese Patent Laid-Open No. 2014-98894 saves energy while enhancing convenience until the user starts to use the image forming apparatus by activating the three sensors: the pyroelectric sensor, the human detecting camera, and the face recognition camera, in stages.

SUMMARY OF THE INVENTION

The technique proposed in Japanese Patent Laid-Open No. 2014-98894 needs three sensors: the pyroelectric sensor, the human detecting camera, and the face recognition camera, to perform moving-object detection, user detection, and user authentication. In other words, the related art needs a plurality of sensors to perform a plurality of detection processes until the user starts to use the image forming apparatus. However, disposing the plurality of sensors in the image forming apparatus not only needs to devise the layout but also increases the manufacturing cost. In other words, the image forming apparatus needs to perform a plurality of processes until the user starts to use the image forming apparatus, such as moving-object detection, user detection, and user authentication, using a smaller number of sensors with low power consumption.

The present invention is made to solve the above problems. The present invention provides a method for performing a plurality of processes until a user starts to use the apparatus on the bases of the output of a single sensor.

An information processing apparatus according to an aspect of the present invention includes an image acquisition unit, a first control unit, a second control unit, and a power control unit. The first control unit is configured to perform a moving-object detection process for detecting a moving object using image data acquired by the image acquisition unit. The second control unit is configured to perform a user authenticating process for authenticating a user who uses the information processing apparatus using the image data acquired by the image acquisition unit. The power control unit is configured to shift the information processing apparatus to a power saving mode in which electric power is supplied to the first control unit and in which supply of electric power to the second control unit is stopped, In the power saving mode, the power control unit shifts the information processing apparatus to a normal power consumption mode in which electric power is supplied to the second control unit when the first control unit detects a moving object in the moving-object detection process.

Further features of the present invention will become apparent from the following description of exemplary embodiments with reference to the attached drawings.

BRIEF DESCRIPTION OF THE DRAWINGS

FIG. 8 is a flowchart illustrating a process that am image processing LSI of the second embodiment executes.

DESCRIPTION OF THE EMBODIMENTS

Embodiment of the present invention will be described hereinbelow with reference to the drawings.

First Embodiment

Figure 1A:
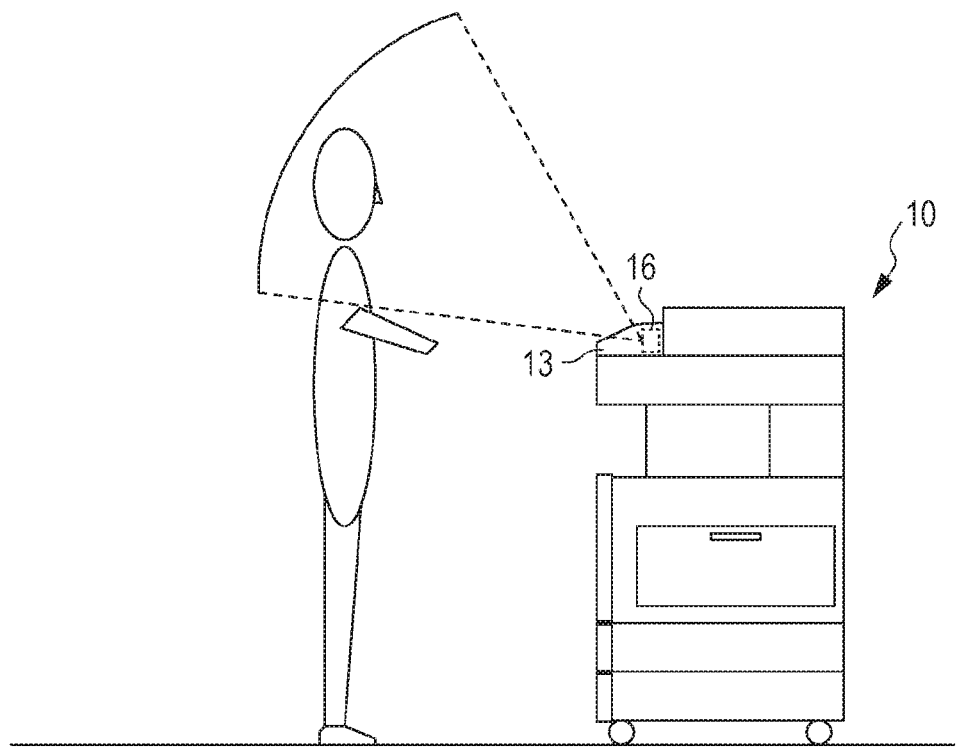
FIG. 1A is a side view of an image forming apparatus of an embodiment illustrating the appearance thereof.
Figure 1B:
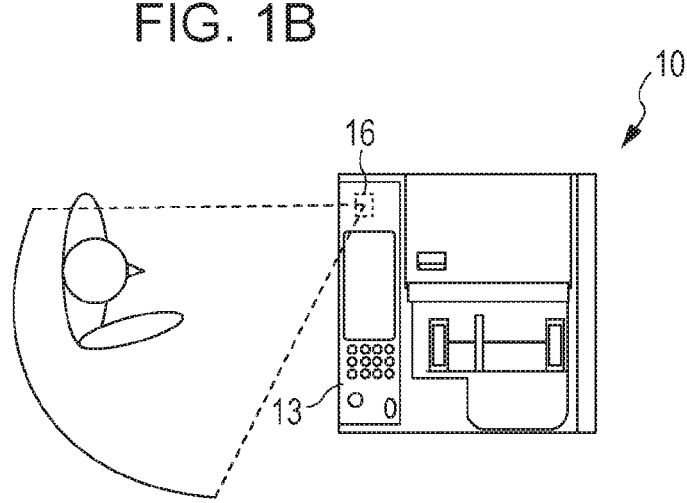
FIG. 1B is a side view of the image forming apparatus.

FIGS. 1A and 1B are diagrams illustrating the appearance of an image forming apparatus according to an embodiment of the present invention. FIG. 1A is a side view, and FIG. 1B is a top view. In FIGS. 1A and 1B, an image forming apparatus 10 of this embodiment is an image processing apparatus having a plurality of functions, such as a printing function, a scanner function, a copying function, and a fax function. The image forming apparatus 10 includes an image analyzing unit 16 for analyzing an image of a person approaching the image forming apparatus 10. The image analyzing unit 16 accommodates a camera 161 (see FIG. 2). The camera 161 is disposed in an orientation (a shooting direction) in which an image of the motion of a human face or hand can be acquired, as indicated by the broken lines in FIGS. 1A and 1B. In the example shown in FIGS. 1A and 1B, the camera 161 is oriented diagonally above in the vertical direction and diagonally left (in the direction of an operating unit 13) in the horizontal direction.

Figure 2:
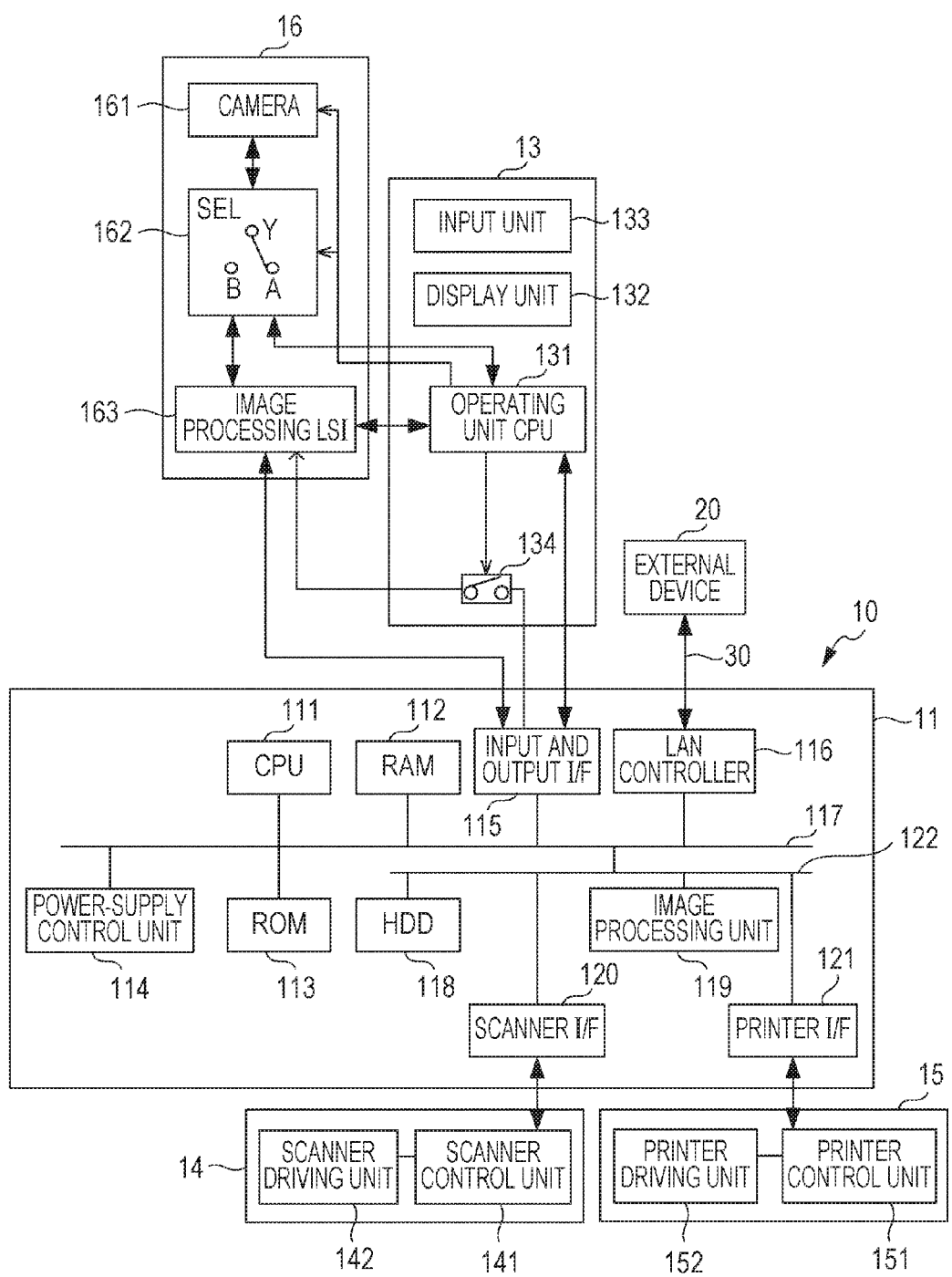
FIG. 2 is a block diagram illustrating the hardware configuration of the image forming apparatus.

FIG. 2 is a block diagram illustrating the hardware configuration of the image forming apparatus 10. The image forming apparatus 10 includes a controller 11 that controls the operation of the image forming apparatus 10, the operating unit 13, a scanner unit 14, a printer unit 15, and an image analyzing unit 16.

The controller 11 can communicate with the operating unit 13, the scanner unit 14, the printer unit 15, and the image analyzing unit 16. The controller 11 includes a central processing unit (CPU) 111, a random access memory (RAM) 112, a read-only memory (ROM) 113, a power-supply control unit 114, an input and output interface (I/F) 115, and a local area network (LAN) controller 116, which are connected to a system bus 117. The controller 11 further includes a hard disk drive (HDD) 118, an image processing unit 119, a scanner I/F 120, and a printer I/F 121, which are connected to an image bus 122.

The CPU 111 has centralized control of access to various connected devices on the basis of control programs stored in the ROM 113 and also centralized control of various processes executed by the controller 11. Furthermore, when the image forming apparatus 10 is not used for a predetermined time, such as when the operating unit 13 is not operated for a fixed time, and no job is received from an external device 20, the CPU 111 shifts the power mode of the image forming apparatus 10 from a standby mode to a sleep mode via the power-supply control unit 114.

The standby mode is a mode in which a reading operation with the scanner unit 14 and a printing operation with the printer unit 15 can be executed. The sleep mode is a power saving mode in which less power is consumed than that in the standby mode. In the sleep mode, electric power is supplied only to the LAN controller 116, the power-supply control unit 114, an operating unit CPU 131, a camera 161, and a bus switch 162, which are necessary for returning from the power saving mode.

The RAM 112 is a system work memory for use in operating the CPU 111 and also for temporarily storing image data. The ROM 113 stores an apparatus boot program and necessary data.

The power-supply control unit 114 is a block for controlling the power supply of the image forming apparatus 10 and controls the power supply according to an instruction from the CPU 111 and a user's operation on a power-saving button (not shown). The power-supply control unit 114 can detect a power-off operation on a power switch (not shown) and can notify the detected result to the CPU 111 as a power-off request. Upon reception of the power-off request, the CPU 111 shifts the image forming apparatus 10 to a state in which the power can be turned off and instructs the power-supply control unit 114 to shut off power.

The LAN controller 116 transmits and receives information to and from the external device 20 connected to a network 30. The HDD 118 stores system software and image data. The image processing unit 119 is used to process images and reads image data stored in the RAM 112 and performs processing on the image data, such as expansion and compression using JPEG or JBIG, and color adjustment.

The scanner I/F 120 is an interface for communicating with the scanner control unit 141 of the scanner unit 14. The printer I/F 121 is an interface for communicating with the printer control unit 151 of the printer unit 15. The image bus 122 is a transmission path for transmitting and receiving image data, for example, a PCI bus and an IEEE 1394 bus.

The scanner unit 14 optically reads an image from an original to generate image data. The scanner unit 14 includes a scanner control unit 141 and a scanner driving unit 142. The scanner driving unit 142 includes a driving section for moving a read head for reading an original and a driving section for conveying the original to a reading position. The scanner control unit 141 controls the operation of the scanner driving unit 142. To perform a scanning process, the scanner control unit 141 receives information set by the user by communicating with the CPU 111 and controls the operation of the scanner driving unit 142 on the basis of the set information.

The printer unit 15 forms an image on a printing medium (a sheet) according to an electrophotographic system, for example. The printer unit 15 includes a printer control unit 151 and a printer driving unit 152. The printer driving unit 152 includes a motor for rotating a photosensitive drum, a mechanism for pressing a fixing unit, and a heater (not shown). The printer control unit 151 controls the operation of the printer driving unit 152. To perform a printing process, the printer control unit 151 receives information set by the user by communicating with the CPU 111 and controls the operation of the printer driving unit 152 on the basis of the set information.

The operating unit 13 is used for the user to operate the image forming apparatus 10 and inputs and outputs information between the image forming apparatus 10 and the user. The operating unit 13 includes an operating unit CPU 131, a display unit 132, an input unit 133, and a field-effect transistor (FET) 134. The operating unit 13 may further include an interface for transferring data between a portable terminal of the user, such as a near field radio communication (NFC) reader writer and a Bluetooth (a registered trademark) module.

The display unit 132 includes a liquid crystal display (LCD) or a light emitting diode (LED) display. The input unit 133 includes a touch panel and a hardware key. The FET 134 is a field effect transistor for controlling power supply to an image processing large-scale integration (LSI) 163. The operating unit CPU 131 implements processes shown in the flowcharts (described later) by reading programs stored in a ROM (not shown) disposed in the operating unit CPU 131 or a flash memory (not shown) disposed in the operating unit 13 and executing the programs.

The image analyzing unit 16 includes the camera 161, the bus switch 162, and the image processing LSI 163. The camera 161 is used to acquire an image of the motion and the face of a person using an image sensor. The bus switch 162 is used to change the destination of the image data acquired by the camera 161. The image processing LSI 163 is used to analyze the image data using an advanced algorithm. The image processing LSI 163 implements the processes as shown in the flowcharts (described later) by reading and executing programs stored in a ROM (not shown) of the image processing LSI 163 and a flash memory (not shown) in the image analyzing unit 16.

The camera 161 of this embodiment can output image data using, for example, an 8-bit parallel signal. The imaging resolution of the camera 161 can be changed between a low resolution of 40×30 and 640×480 in a VGA format. The bus switch 162 is a complementary metal-oxide semiconductor (CMOS) 8-bit bus switch capable of changing the destination of the 8-bit parallel signal.

Figure 3:
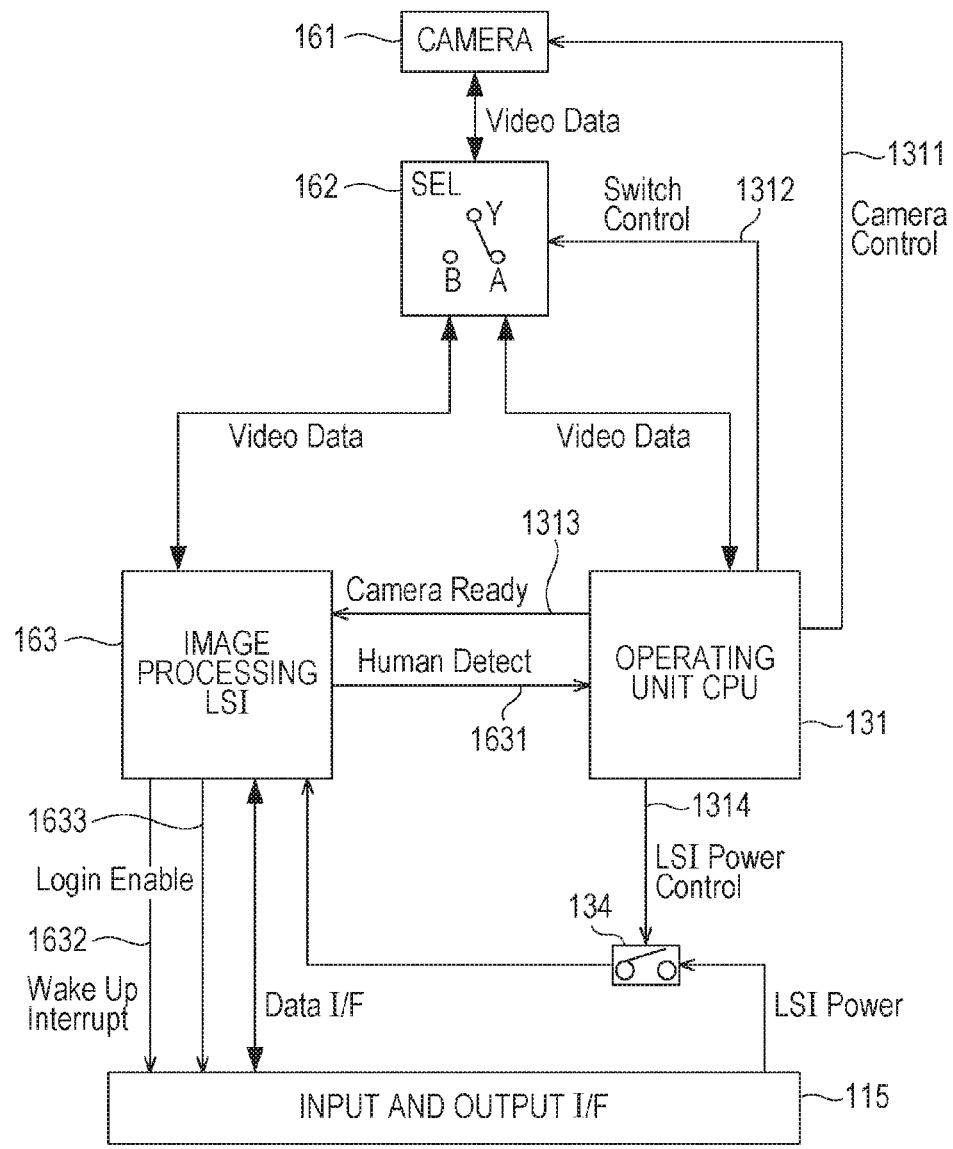
FIG. 3 is a block diagram illustrating a detailed configuration around an image analyzing unit and am operating unit CPU according to a first embodiment of the present invention.

When no person is present in front of the image forming apparatus 10, the camera 161 is set at a low resolution, and the data flow through the bus switch 162 is set at Y→A (see FIG. 3). The FET 134 is at OFF-state, so that the image processing LSI 163 is not supplied with electric power. The bus switch 162 also has the role of reducing electrical stress applied to an external terminal of the image processing LSI 163 by electrically isolating the camera 161 supplied with electric power and the image processing LSI supplied with no electric power from each other.

In this state, the image data acquired by the camera 161 is processed by the operating unit CPU 131. The operating unit CPU 131 acquires images from the camera 161 at regular intervals and stores the data in a RAM (not shown) in the operating unit CPU 131. If the camera 161 is not set at low resolution, and the proportion of the image data in the capacity of the internal RAM is high, the data may be stored ion an external synchronous dynamic random access memory (SDRAM) (not shown). The operating unit CPU 131 performs moving-object detection using a background differencing technique of calculating the difference between the image stored in the internal RAM and the newly acquired image, and if there is a difference above a certain level, determining that a moving object is present in front of the image forming apparatus 10. This eliminates the need for the operating unit CPU 131 to process and analyze the image data, and requires significantly lower performance of the operating unit CPU 131 than that of the image processing LSI 163. However, if the operating unit CPU 131 has sufficient processing capacity, the image data may be subjected to filtering or other processing.

When the operating unit CPU 131 determines that a moving object is detected, the operating unit CPU 131 sets the FET 134 to ON state. This causes the image processing LSI 163 to be supplied with electric power. Furthermore, the operating unit CPU 131 sets the resolution of the camera 161 high, and sets the data flow through the bus switch 162 Y→B (see FIG. 3). This causes high-resolution image data to be output to the image processing LSI 163. The image processing LSI 163 performs a user detection process for determining whether the person present in front of the image forming apparatus 10 is a user who intends to use the image forming apparatus 10 on the basis of the input image data.

As described above, when no moving object is detected, the image forming apparatus 10 of this embodiment uses the operating unit CPU 131 that consumes little electric power to enhance energy saving. If a moving object is detected, the image forming apparatus 10 uses the image processing LSI 163 that consumes much electric power but has high processing capability to enhances user convenience.

FIG. 3 is a block diagram illustrating a detailed configuration around the image analyzing unit 16 and the operating unit CPU 131 of the first embodiment. In FIG. 3, a camera control signal (Camera Control) 1311 is a control signal used when the operating unit CPU 131 sets a register in the camera 161 to change the format, the resolution, the frame rate, etc. of the image. A bus switch control signal (Switch Control) 1312 is a control signal used when the operating unit CPU 131 switches the data flow through the bus switch 162.

A camera ready signal (Camera Ready) 1313 is a signal used when the operating unit CPU 131 notifies the image processing LSI 163 of setting of the register in the camera 161 and whether setting of the bus switch control signal 1312 has appropriately been completed. An LSI power-supply control signal (LSI Power Control) 1314 is a control signal for switching the FET 134 between ON and OFF to switch the power supply state of the image processing LSI 163. When the FET 134 is OFF, the image processing LSI 163 is not supplied with electric power, and when the FET 134 is switched from OFF to ON, power supply to the image processing LSI 163 is started to activate the image processing LSI 163.

The image processing LSI 163 acquires image data from the camera 161 and determines whether a person is present from the image data. For example, the image processing LSI 163 implements an identification algorithm using, for example, pattern matching and a histogram of oriented gradients (HOG). When the image processing LSI 163 detects a person, the image processing LSI 163 asserts a human detecting signal 1631 (Human Detect). When no moving object is detected using the background differencing technique, that is, when only a motionless object is present in the image data, the operating unit CPU 131 stores the image data to update the background. In other words, when the human detecting signal 1631 is asserted, a person (a moving object) is present in front of the image forming apparatus 10, and the operating unit CPU 131 does not update the background.

The image processing LSI 163 detects a person in the image data and determines whether the person is a user who uses the image forming apparatus 10. For example, the image processing LSI 163 executes an identification algorithm using a Haar-like feature to detect the orientation of the face or the eyes in the image data, and when the orientation is in the direction of the image forming apparatus 10, the image processing LSI 163 determines that the person is a user. When the image processing LSI 163 detects a user who uses the image forming apparatus 10, the image processing LSI 163 asserts a sleep return signal (Wake Up Interrupt) 1632 to notify the power-supply control unit 114 that a user is present in front of the image forming apparatus 10. After receiving the notification, the power-supply control unit 114 may shift the power mode of the image forming apparatus 10 from the sleep mode to the standby mode.

When the user is detected, as described above, the image processing LSI 163 performs an authentication process of comparing the feature data acquired from the image data with feature data registered in advance to determine whether the user in front of the image forming apparatus 10 is permitted to use the image forming apparatus 10. For example, a face image is stored in the ROM in the image processing LSI 163, the HDD 118, or an external server on the network 30, and the image processing LSI 163 acquires the data via the input and output I/F 115. Then, the image processing LSI 163 calculates the similarity between the image data acquired from the camera 161 and the data acquired from the internal ROM or the like, and if the similarity indicates a predetermined value or greater, the image processing LSI 163 determines that the user is an authenticated user. When the user given permission for use is detected, the image processing LSI 163 asserts a login enable signal (Login Enable) 1633 to notify the CPU 111 that face authentication has succeeded. After receiving the notification, the CPU 111 controls the image forming apparatus 10 according to the result of authentication.

Figure 4:
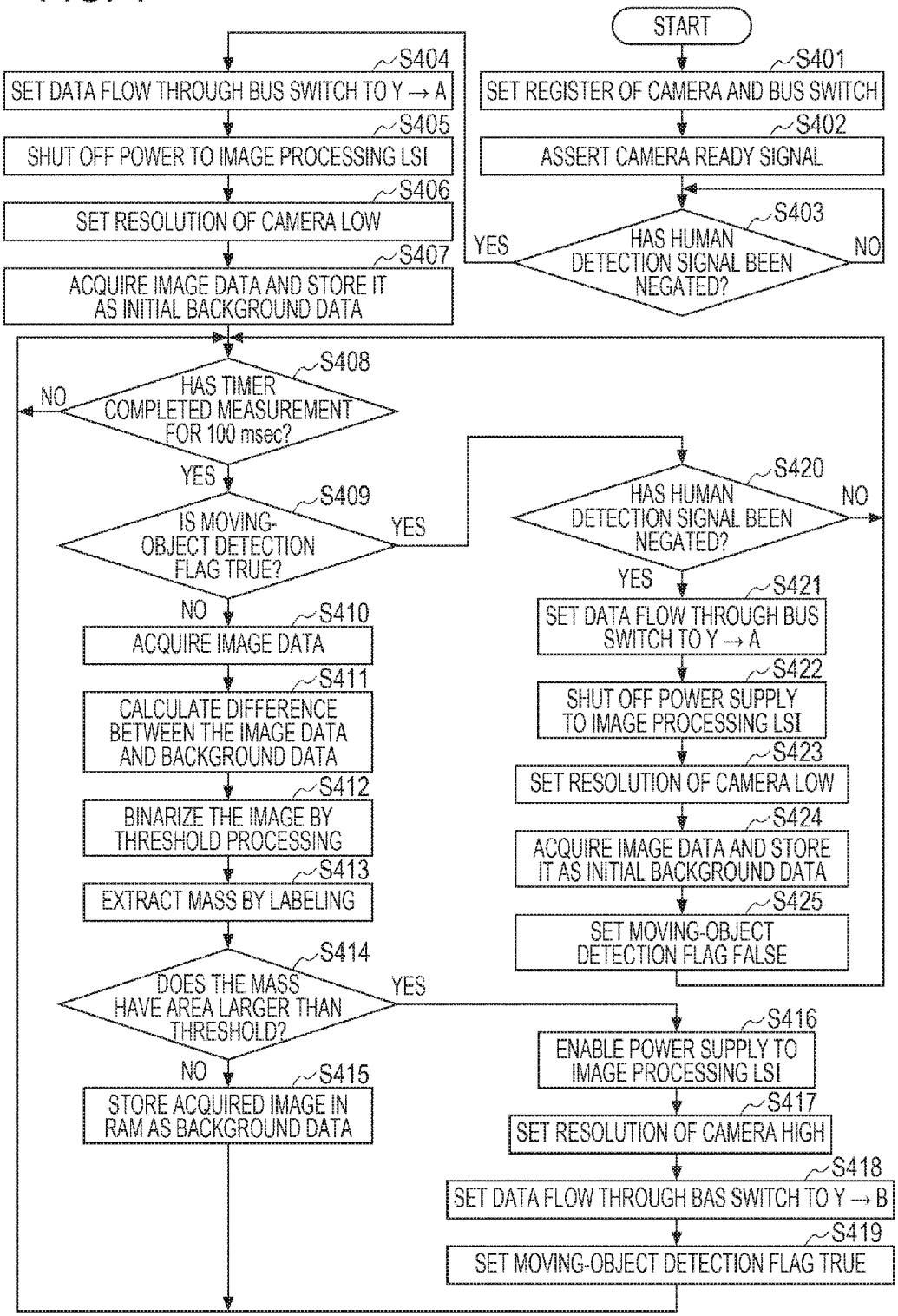
FIG. 4 is a flowchart illustrating a process that the operating unit CPU of the first embodiment executes.

FIG. 4 is a flowchart illustrating a process that the operating unit CPU 131 of the first embodiment executes. The process in the flowchart is implemented by the operating unit CPU 131 reading and executing a program stored in its internal ROM or the like.

Upon power up, the operating unit CPU 131 starts the process of the flowchart. First at S401, the operating unit CPU 131 performs initial settings, for example, setting the register of the camera 161 and setting the bus switch 162, so that the system operates properly. After the initial settings are appropriately set, the operating unit CPU 131 asserts the camera ready signal 1313 at S402 to notify the image processing LSI 163 that the settings on the system have been completed.

Next at S403, the operating unit CPU 131 waits until the human detecting signal 1631 is negated by the image processing LSI 163. In this case, the operating unit CPU 131 waits until no moving object is present in front of the image forming apparatus 10. If it is determined that the human detecting signal is negated (Yes at S403), then at S404 the operating unit CPU 131 sets the data flow through the bus switch from Y to A.

Next at S405, the operating unit CPU 131 shuts off power to the image processing LSI 163, and at S406 sets the resolution of the camera 161 low.

Next at S407, the operating unit CPU 131 acquires image data from the camera 161 and stores the image data in the internal RAM as initial background image data. At this time, to reduce random noise in the image data, the operating unit CPU 131 may acquire image data a plurality of times at regular intervals and may use the average of the image data as initial background image data.

The operating unit CPU 131 starts measurement for 100 msec with a timer built in the operating unit CPU 131 and at S408 waits until the timer completes the measurement for 100 msec. If it is determined that the timer has completed the measurement for 100 msec (Yes at S408), the operating unit CPU 131 restarts the timer to go to S409. That is, the operating unit CPU 131 operates to perform the process of S409 onward every 100 msec.

At S409, the operating unit CPU 131 determines whether a moving-object detection flag is "TRUE". If it is determined that the moving-object detection flag is not "TRUE" (No at S409), the operating unit CPU 131 performs image processing operations, such as acquisition of image data (S410), calculation of a difference from the background data (S411), binarization (S412), and labeling (S413). More specifically, at S410, the operating unit CPU 131 acquires image data from the camera 161. Furthermore, at S411, the operating unit CPU 131 calculates the difference between the image data acquired at S410 and the background image data. Furthermore, at S412, the operating unit CPU 131 binarizes the difference data generated at S411 by threshold processing. Furthermore, the operating unit CPU 131 extracts a mass from the binary data generated at S412 by labeling processing (S413).

Next at S414, the operating unit CPU 131 determines whether the mass extracted by the labeling processing at S413 includes a mass having an area larger than or equal to a predetermined threshold value. If it is determined that there is no mass having an area larger than or equal to the predetermined threshold value (No at S414), the operating unit CPU 131 goes to S415. At S415, the operating unit CPU 131 determines that the image data acquired at S410 includes no moving object, stores the image in the internal RAM as new background data, and goes to S408.

In contrast, if at S414 the operating unit CPU 131 determines that a mass having an area larger than or equal to the predetermined threshold vale (Yes at S414), the operating unit CPU 131 determines that a moving object is present in the image data and goes to S416. That is, the operating unit CPU 131 detects a moving object using the background differencing technique.

At S416, the operating unit CPU 131 enables power supply to the image processing LSI 163 by operating (by turning on) the FET 134. Next, at S417, the operating unit CPU 131 sets the resolution of the camera 161 high. At S418, the operating unit CPU 131 sets the data flow through the bus switch 162 from Y to B. In other words, the operating unit CPU 131 operates t so that the image data acquired by the camera 161 is output to the image processing LSI 163.

At S419, the operating unit CPU 131 sets the moving-object detection flag to "TRUE" so as not to perform the operations (S410 to S419) starting from acquisition of image data from then on even at process timing every 100 msec and goes to S408.

If at S409 it is determined that the moving-object detection flag is "TRUE" (Yes at S409), the operating unit CPU 131 goes to S420. At S420, the operating unit CPU 131 determines whether the human detecting signal 1631 is negated. If it is determined that the human detecting signal 1631 is not negated (No at S420), the operating unit CPU 131 goes to S408. In other words, since the image processing is performed by the image processing LSI 163 after the moving-object detection flag is set to "TRUE", the operating unit CPU 131 waits until the human detecting signal 1631 is negated again.

In contrast, if it is determined that the human detecting signal 1631 is negated (Yes at S420), the operating unit CPU 131 goes to S421. At S421 to S424, the operating unit CPU 131 performs the same processes as those at the start-up (S404 to S407) (descriptions thereof will be omitted because they are the same as those of S404 to S407). If it is determined by the image processing LSI 163 that no person is present in the image data acquired by the camera 161, the human detecting signal 1631 is negated, which will be described using FIG. 5. In other words, if it is determined by the image processing LSI 163 that no person is present in the image data acquired by the camera 161, the operating unit CPU 131 updates the background image data using the background differencing technique. Furthermore, at S425, the operating unit CPU 131 sets the moving-object detection flag to "FALSE" and goes to S408.

Figure 5:
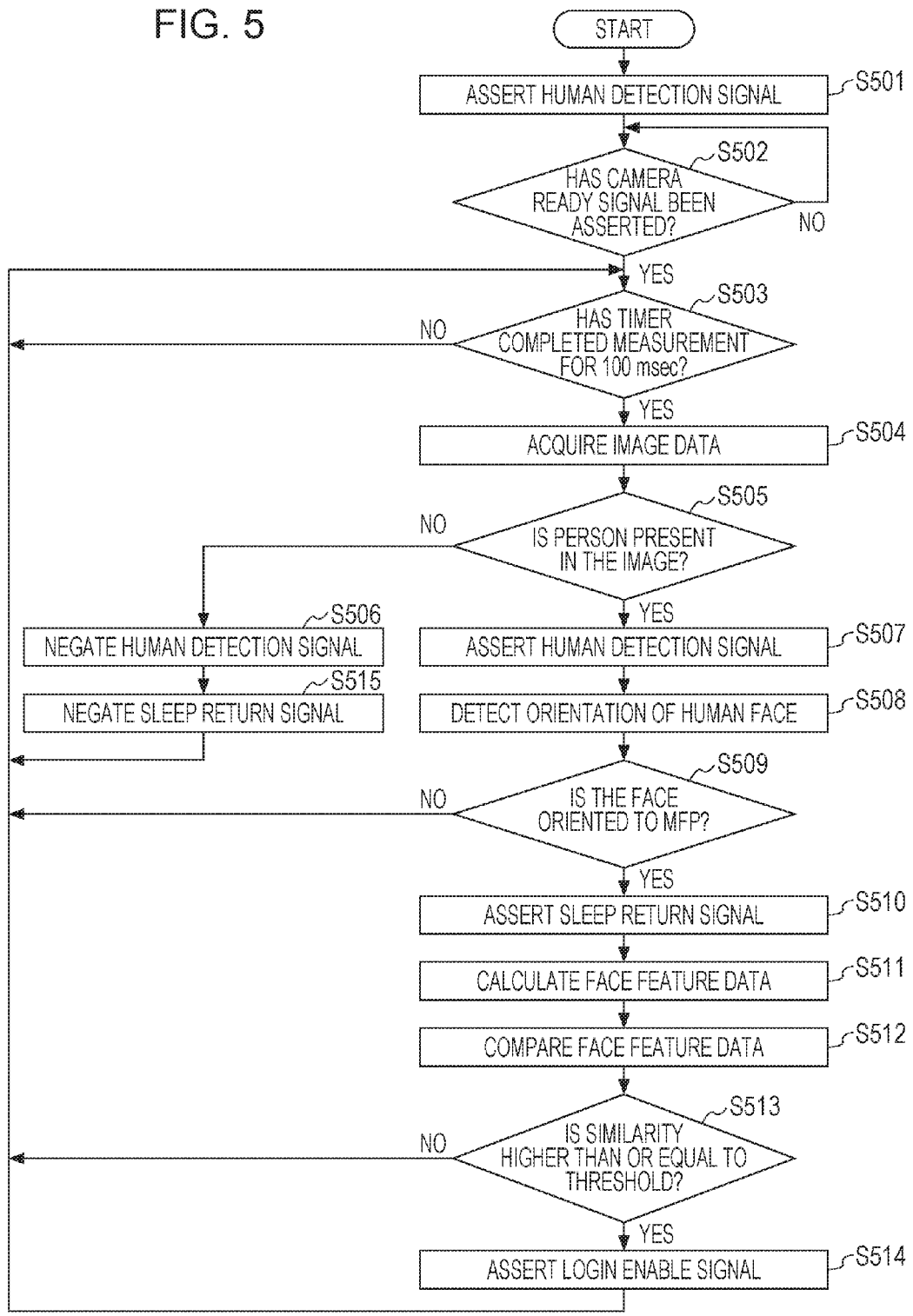
FIG. 5 is a flowchart illustrating a process that an image processing LSI of the first embodiment executes.

FIG. 5 is a flowchart illustrating a process that the image processing LSI 163 of the first embodiment executes. The process of this flowchart is implemented by the image processing LSI 163 reading and executing a program stored in its internal ROM or the like.

When power is applied, the image processing LSI 163 starts the process of the flowchart. First at S501, the image processing LSI 163 sets the human detecting signal 1631 to "assert". Next at S502, the image processing LSI 163 waits until the camera ready signal 1313 is asserted. If it is determined that the camera ready signal is asserted (Yes at S502), the image processing LSI 163 starts the timer in the image processing LSI 163 and goes to S503.

At S503, the image processing LSI 163 waits until the timer completes measurement for 100 msec. If it is determined that the timer has completed the measurement for 100 msec (Yes at S503), the image processing LSI 163 restarts the timer to go to S504. That is, the image processing LSI 163 operates to perform the process of S504 onward every 100 msec.

At S504, the image processing LSI 163 acquires image data from the camera 161. Then at S505, the image processing LSI 163 determines whether a person is present using the image data acquired at S504. For example, the image processing LSI 163 detects a person by implementing an identification algorithm using, for example, pattern matching and HOG.

If no person is detected (No at S505), the image processing LSI 163 goes to S506. At S506, the image processing LSI 163 negates the human detecting signal 1631, and at S515, negates the sleep return signal 1632 and goes to S503. The negation of the human detecting signal 1631 shuts off power to the image processing LSI 163 (S422 in FIG. 4).

If a person is detected (Yes at S505), the image processing LSI 163 goes to S507. At S507, the image processing LSI 163 asserts the human detecting signal 1631. At S508 to S509, the image processing LSI 163 determines whether the person detected at S505 is a user who uses the image forming apparatus 10. For example, the image processing LSI 163 executes an identification algorithm using a Haar-like feature to detect the orientation of the face or the eyes from the image data (S508), determines whether the face or the eyes face the image forming apparatus 10 (S509), and if the face or the eyes face the image forming apparatus 10, the image processing LSI 163 determines that the person is a user.

If it is determined at S509 that the orientation of the face or the eyes detected at S508 does not face the image forming apparatus 10 (No at S509), the image processing LSI 163 determines that a user of the image forming apparatus 10 is not detected and goes to S503.

In contrast, if it is detected that the orientation of the face or the eyes detected at S508 faces the image forming apparatus 10 (Yes at S509), the image processing LSI 163 determines that a user of the image forming apparatus 10 is detected and goes to S510.

At S510, the image processing LSI 163 asserts the sleep return signal 1632 to notify the power-supply control unit 114 that a user is present in front of the image forming apparatus 10. Upon receiving the notification, the power-supply control unit 114 may shift the power mode of the image forming apparatus 10 from the sleep mode to the standby mode.

Next at S511, the image processing LSI 163 calculates the feature data acquired from the image data. Furthermore, at S512 to S513, the image processing LSI 163 compares the feature data calculated at S511 with feature data registered in advance to determine whether the user present in front of the image forming apparatus 10 is permitted to use the image forming apparatus 10. For example, a face image is stored in advance in the ROM in the image processing LSI 163, the HDD 118, or an external server on the network 30, and the image processing LSI 163 acquires the data via the input and output I/F 115. Thereafter, the image processing LSI 163 calculates the similarity between the image data acquired from the camera 161 and the acquired data (S511) to determine whether the similarity is higher than or equal to a fixed value (S512 and S513).

If it is determined that the similarity is not higher than or equal to the fixed value (No at S513), the image processing LSI 163 determines that the user present in front of the image forming apparatus 10 is not a user who is permitted to use the image forming apparatus 10 and goes to S503.

If it is determined that the similarity is higher than or equal to the fixed value (Yes at S513), the image processing LSI 163 determines that the user present in front of the image forming apparatus 10 is a user who is permitted to use the image forming apparatus 10 and goes to S514. At S514, the image processing LSI 163 asserts the login enable signal 1633 to notify the CPU 111 that the face authentication has succeeded and goes to S503. Upon receiving the login enable signal 1633, the CPU 111 controls the image forming apparatus 10 according to the result of authentication. For example, the CPU 111 brings the image forming apparatus 10 into a state in which it is logged in by the user who is authenticated by facial recognition.

At S508 to S509 in the above example, the image processing LSI 163 detects the orientation of the face or the eyes from the image data and detects a user on the basis of the detected orientation. This is given for mere illustration and is not intended to limit the present invention. For example, the image processing LSI 163 may detect a user by determining whether a moving object is approaching the image forming apparatus 10. In another example, the image processing LSI 163 may detect a user by determining whether an object appears and stays in front of the image forming apparatus 10.

As described above, the first embodiment enables power saving control of an image forming apparatus using moving-object detection, user detection, and user authentication based on the output of a single sensor (the camera 161). Thus, an image forming apparatus can be provided which includes sensors with a simple layout and is manufactured at a low cost and which achieves both power saving and user convenience.

Second Embodiment

While the first embodiment shows a configuration in which the image processing LSI 163 detects a person and determines whether the person is a user who uses the image forming apparatus 10, a second embodiment shows a configuration in which the operating unit CPU 131 determines whether the person is a user. In the second embodiment, the operating unit CPU 131 detects a moving object from low-resolution image data and determines whether the moving object is approaching the image forming apparatus 10 to determine whether the detected moving object is a user who uses the image forming apparatus 10. Alternatively, the operating unit CPU 131 may detect a user by determining whether an object comes and stays in front of the image forming apparatus 10 from low-resolution image data. These configurations of the second embodiment reduce the number of times the image processing LSI 163 is activated as compared with the configuration of the first embodiment, thus further enhancing energy saving.

Figure 6:
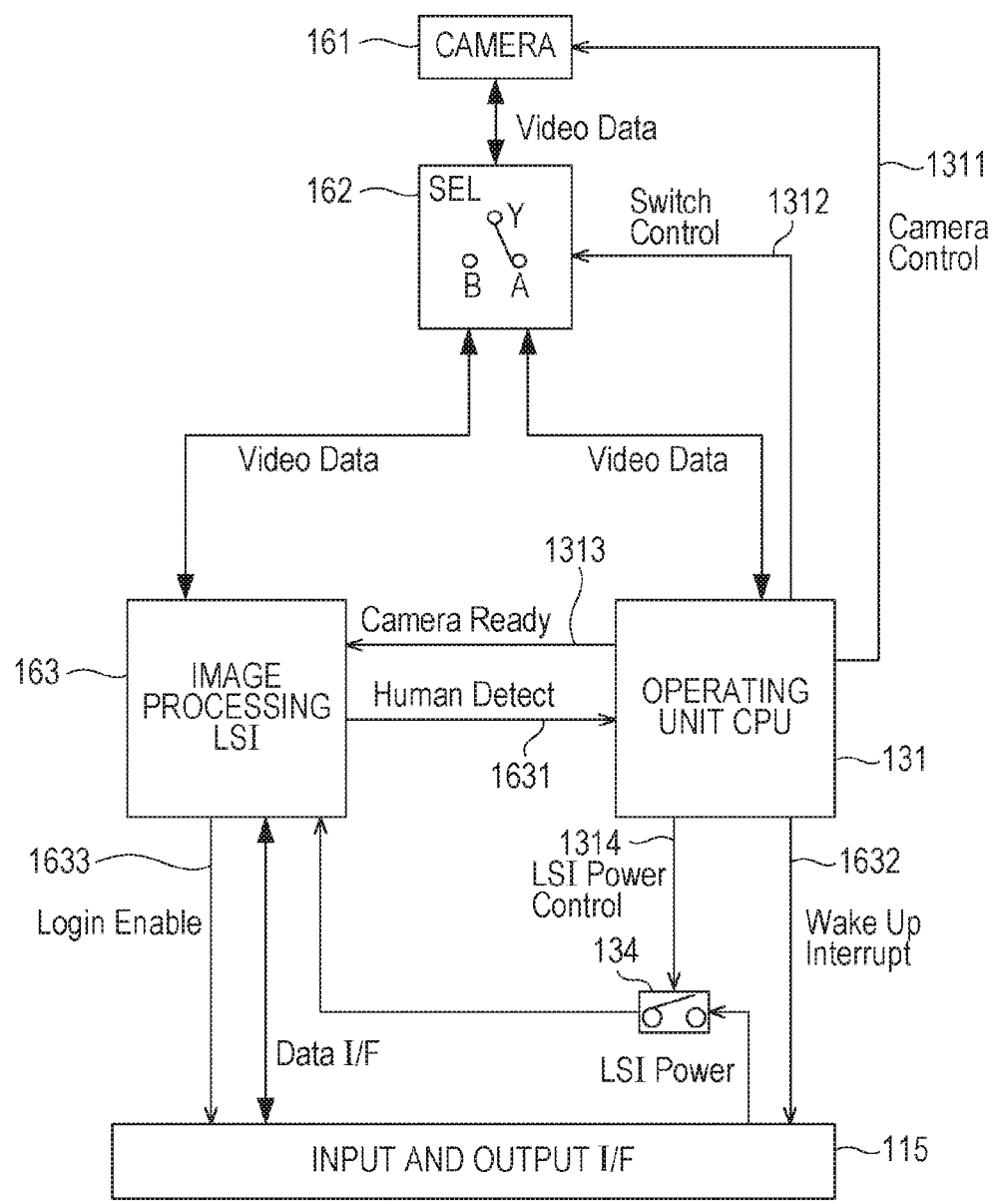
FIG. 6 is a block diagram illustrating a detailed configuration around an image analyzing unit and an operating unit CPU according to a second embodiment of the present invention.

FIG. 6 is a block diagram illustrating a detailed configuration around an image analyzing unit 16 and an operating unit CPU 131 of the second embodiment. In the first embodiment shown in FIG. 3, the sleep return signal 1632 is supplied from the image processing LSI 163. In contrast, the sleep return signal 1632 of the second embodiment is supplied not from the image processing LSI 163 but from the operating unit CPU 131.

The operating unit CPU 131 determines whether a moving object extracted from image data is approaching the image forming apparatus 10. If it is determined that a moving object is approaching the image forming apparatus 10, the operating unit CPU 131 asserts the sleep return signal 1632 to notify the power-supply control unit 114 that a user is present in front of the image forming apparatus 10. Upon receiving the notification, the power-supply control unit 114 may shift the power mode of the image forming apparatus 10 from the sleep mode to the standby mode.

Figure 7:
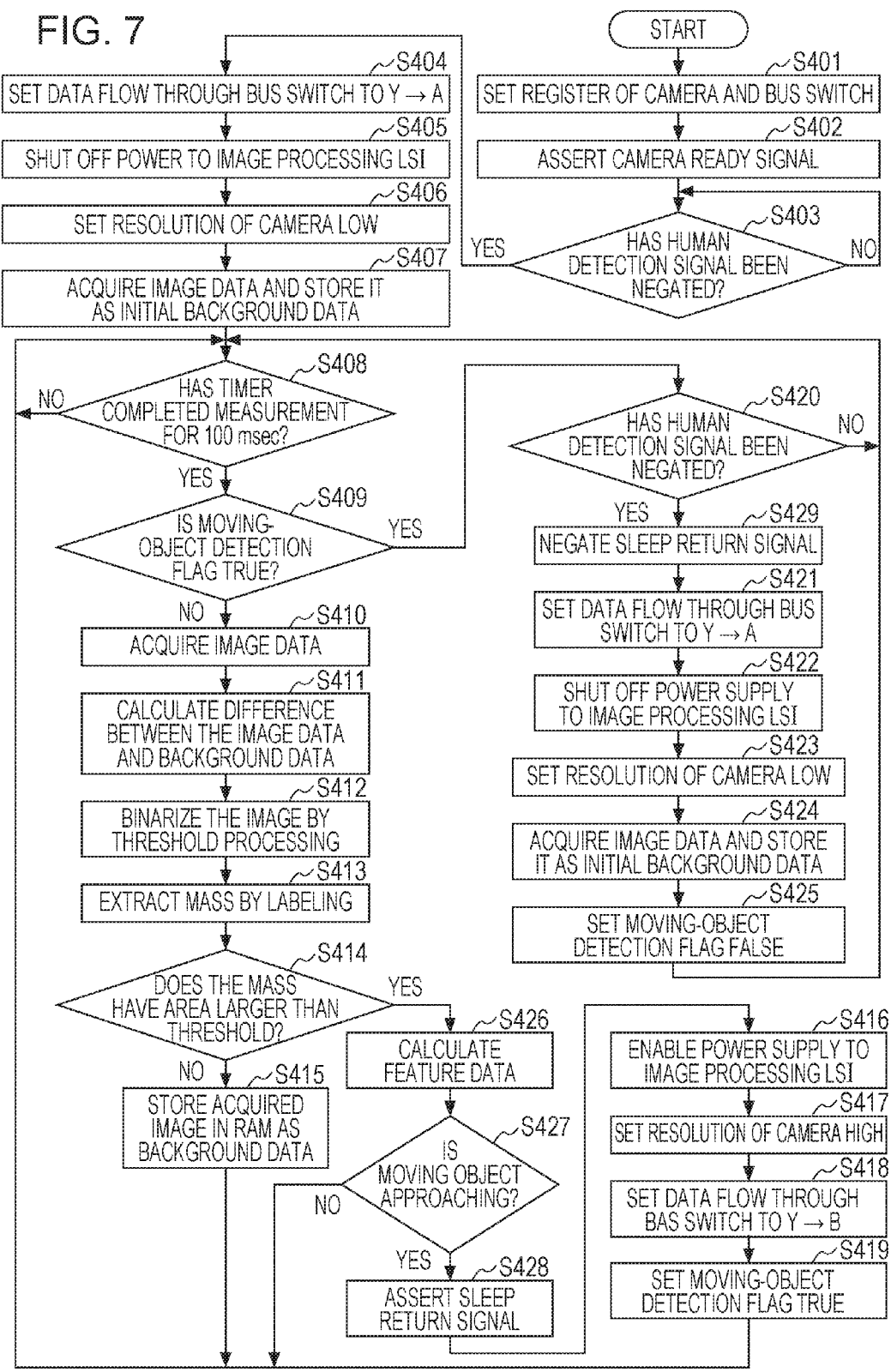
FIG. 7 is a flowchart illustrating a process that the operating unit CPU of the second embodiment executes.

FIG. 7 is a flowchart illustrating a process that the operating unit CPU 131 of the second embodiment executes. The process of this flowchart is implemented by the operating unit CPU 131 reading and executing a program stored in its internal ROM or the like. The same steps as those in FIG. 4 are given the same step numbers, and descriptions thereof will be omitted.

In this embodiment, the number of processes required for the operating unit CPU 131 is larger than that for the first embodiment (S426 to S429). Specifically, if Yes at S414 and a moving object is detected, the operating unit CPU 131 calculates the features of the moving object at S426, in addition to the moving-object detection process (S410 to S414). Examples of the features include the center of gravity, the area, the height, and the width of the moving object.

Next at S427, the operating unit CPU 131 determines whether the moving object is approaching the image forming apparatus 10 from the features calculated at S426. For example, the operating unit CPU 131 can determine whether the moving object is approaching by simple pattern matching, dynamic programming (DP) matching, or machine learning using a hidden Markov model or a neural network by using time-series feature data acquired at regular intervals, which is stored in the operating unit CPU 131.

If it is determined that the moving object is approaching (Yes at S427), then at S428, the operating unit CPU 131 asserts the sleep return signal 1632 to notify the power-supply control unit 114 that a user is present in front of the image forming apparatus 10. Upon receiving the notification, the power-supply control unit 114 may shift the power mode of the image forming apparatus 10 from the sleep mode to the standby mode.

If at S420 it is determined that the human detecting signal 1631 is negated (Yes at S420), then at S429, the operating unit CPU 131 negates the sleep return signal 1632 and goes to S421. The other processes are the same as those of the first embodiment shown in FIG. 4, and descriptions thereof will be omitted.

Next, the operation of the image processing LSI 163 of the second embodiment will be described. FIG. 8 is a flowchart illustrating a process that the image processing LSI 163 of the second embodiment executes. The process of the flowchart is executed by the image processing LSI 163 reading and implementing a program stored in its internal ROM or the like. The same steps as those in FIG. 5 are given the same step numbers, and descriptions thereof will be omitted.

In the second embodiment, the image processing LSI 163 negates the human detecting signal 1631 at S506 and directly goes to S503. Furthermore, the image processing LSI 163 asserts the human detecting signal 1631 at S507 and directly goes to S511. Since the other processes are the same as those of the first embodiment shown in FIG. 5, descriptions thereof will be omitted.

Since the number of times the image processing LSI 163 is activated is smaller than that of the first embodiment, as described above, power saving can be further enhanced as compared with the first embodiment, in addition to the advantageous effects of the first embodiment.

In the first embodiment and the second embodiment, power supply to the image processing LSI 163 is controlled by turning on and off the FET 134. In some case, the image processing LSI 163 may have a plurality of modes including the sleep mode, with which electric power can be significantly reduced. In this case, there is no need for the FET 134, and the image processing LSI 163 can be shifted from the sleep mode to a power mode in which the processes shown in FIG. 5 and FIG. 8 that consume a lot of electric power can be executed by sending a signal corresponding to the LSI power-supply control signal 1314 from the operating unit CPU 131 to the image processing LSI 163.

In the first and second embodiments, the operating unit CPU 131 switches the bus switch 162 so that image data acquired by the camera 161 is output to the image processing LSI 163. The image data acquired by the camera 161 may be always input to the operating unit CPU 131, from which the image data may be output to the image processing LSI 163. Furthermore, the bus switch 162 may not be provided, and instead of switching the bus switch 162 from Y→A to Y→B, the image data acquired by the camera 161 may be output from the operating unit CPU 131 to the image processing LSI 163.

With the configuration in which the output of image data acquired by the camera 161 is switched using the bus switch 162, when the output of the image data is switched to the image processing LSI 163, the power mode of the operating unit CPU 131 may be switched to the power saving mode, or power supply to the operating unit CPU 131 may be stopped.

The operating unit CPU 131 and the image processing LSI 163 may be implemented not only by the CPU but also by a graphic processing unit (GPU), an application specific integrated circuit (ASIC), or a field-programmable gate array (FPGA), and part of the processes to be executed may be implemented by hardware, such as a FPGA. Furthermore, part of the blocks shown in FIGS. 2, 3, and 6 may be implemented in an integrated circuit, such as a FPGA.

Although the above embodiments have been described using the image forming apparatus 10 as an example of an information processing apparatus to which the present invention can be applied, this is given for mere illustration and is not intended to limit the present invention; for example, a personal computer and home electrical appliances may be applied.

Thus, the embodiments of the present invention do not need to dispose a plurality of sensors in the apparatus unlike the related art. This eliminates the need for devising a layout and will not increase the product cost. In other words, the image forming apparatus incorporating the embodiments of the present invention executes a plurality of processes until the user starts to use the image forming apparatus, such as moving-object detection, user detection, and user authentication, with a single sensor (the camera 161) using reduced power.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-054678, filed Mar. 18, 2015, which is hereby incorporated by reference herein in its entirety.

What is claimed is:

1. An Information processing apparatus, comprising:
a camera that acquires image data;
a first control unit that performs a moving-object detection process for detecting a moving object using low resolution image data acquired by the camera;
a second control unit that performs a user authenticating process for authenticating a user who uses the information processing apparatus using high resolution image data acquired by the camera in a normal power consumption mode; and
a power control unit that shifts the information processing apparatus to a power saving mode in which electric power is supplied to the first control unit and in which supply of electric power to the second control unit is stopped,
wherein, in the power saving mode, the power control unit shifts the information processing apparatus to the normal power consumption mode in which electric power is supplied to the second control unit when the first control unit detects a moving object in the moving-object detection process;
wherein, in the power saving mode, the camera has low imaging resolution, and in the normal power consumption mode, the camera has high imaging resolution.

2. The information processing apparatus according to claim 1, wherein the first control unit performs the moving-object detection process by comparing the low resolution image data acquired by the camera with background data stored in advance.

3. The information processing apparatus according to claim 1, wherein the second control unit performs the user authenticating process by comparing a feature of a face of a user imaged by the camera with a feature of a user stored in advance.

4. The information processing apparatus according to claim 1, further comprising a switching unit that switches a destination of the image data acquired by the camera to the first control unit or the second control unit,
wherein, in the power saving mode, the switching unit switches the destination of the image data acquired by the camera to the first control unit, and in the normal power consumption mode, switches the destination of the image data acquired by the camera to the second control unit.

5. The information processing apparatus according to claim 4, wherein the switching unit comprises a bus switch.

6. The information processing apparatus according to claim 4, wherein, when a moving object is detected in the moving-object detection process, the first control unit switches the destination of the image data acquired by the camera from the first control unit to the second control unit.

7. The information processing apparatus according to claim 1, further comprising a printing unit that prints an image on a sheet.

8. The information processing apparatus according to claim 7,
wherein the second control unit further performs a face-orientation detecting process for detecting orientation of a face of the user who uses the information processing apparatus using the image data acquired by the camera, and
wherein, when the second control unit determines that the orientation of the face of the user faces a predetermined direction in the face-orientation detecting process, the power control unit shifts the information processing apparatus to an operating mode in which the printing unit is capable of printing.

9. The information processing apparatus according to claim 1, wherein the single sensor from the camera comprises a camera.

10. The information processing apparatus according to claim 1, wherein the camera is disposed upward with respect to a horizontal direction.

11. A method for controlling an information processing apparatus comprising a camera having a single sensor that acquires image data, the method comprising:
performing a moving-object detection process for detecting a moving object using low resolution image data acquired by the camera;
performing a user authenticating process for authenticating a user who uses the information processing apparatus using high resolution image data acquired by the camera in a normal power consumption mode;
shifting the information processing apparatus to a power saving mode in which electric power is supplied to a first control unit that performs the moving-object detection process and in which supply of electric power to a second control unit that performs the user authenticating process is stopped; and
in the power saving mode, shifting the information processing apparatus to the normal power consumption mode in which electric power is supplied to the second control unit when a moving object is detected in the moving-object detection process,
wherein, in the power saving mode, the camera has low imaging resolution, and in the normal power consumption mode, the camera has high imaging resolution.

12. The method for controlling the information processing apparatus according to claim 11, wherein the first control unit performs the moving-object detection process by comparing the low resolution image data acquired by the camera with background data stored in advance.

13. The method for controlling the information processing apparatus according to claim 11, wherein the second control unit performs the user authenticating process by comparing a feature of a face of a user imaged by the camera with a feature of a user stored in advance.

14. The method for controlling the information processing apparatus according to claim 11, the method further comprising, in the power saving mode, switching a destination of the image data acquired by the camera to the first control unit, and in the normal power consumption mode, switching the destination of the image data acquired by the camera to the second control unit.

15. The method for controlling the information processing apparatus according to claim 11, the method further comprising printing an image on a sheet.

16. The method for controlling the information processing apparatus according to claim 11, the method further comprising:
performing a face-orientation detecting process for detecting orientation of a face of the user who uses the information processing apparatus using the image data acquired by the camera; and
when the orientation of the face of the user faces a predetermined direction in the face-orientation detecting process, shifting the information processing apparatus to an operating mode in which a printing unit is capable of printing.

* * * * *